United States Patent [19]

Koike

[11] Patent Number: 5,890,206
[45] Date of Patent: Mar. 30, 1999

[54] METHOD OF WRITING SEQUENTIAL DATA TO A DISC MEMORY SYSTEM HAVING A FIXED BLOCK ARCHITECTURE

[75] Inventor: Hideki Koike, Tokyo, Japan

[73] Assignee: NEC Corporation, Tokyo, Japan

[21] Appl. No.: 727,092

[22] Filed: Oct. 7, 1996

[30] Foreign Application Priority Data

Oct. 20, 1995 [JP] Japan .................................... 7-272948

[51] Int. Cl.$^6$ .......................... G06F 12/08; G06F 12/00; G06F 13/00; G06F 12/16
[52] U.S. Cl. .............. 711/112; 711/4; 711/113; 711/114; 711/170
[58] Field of Search ............ 711/4, 100, 147, 711/112, 113, 114

[56] References Cited

U.S. PATENT DOCUMENTS

| | | | |
|---|---|---|---|
| 4,872,073 | 10/1989 | Fincher et al. | 360/51 |
| 5,172,379 | 12/1992 | Burrer et al. | 371/40.12 |
| 5,650,969 | 7/1997 | Niijima et al. | 711/112 |
| 5,664,144 | 9/1997 | Yanai et al. | 711/113 |
| 5,737,577 | 8/1996 | Martini et al. | 711/173 |

FOREIGN PATENT DOCUMENTS

| | | |
|---|---|---|
| 57-117053 | 7/1982 | Japan . |
| 58-54463 | 3/1983 | Japan . |
| 58-199412 | 11/1983 | Japan . |
| 2-9063 | 1/1990 | Japan . |
| 4-40166 | 2/1990 | Japan . |

*Primary Examiner*—Eddie P. Chan
*Assistant Examiner*—Kimberly McLean
*Attorney, Agent, or Firm*—Young & Thompson

[57] ABSTRACT

When sequential records are sequentially written to data blocks each having a fixed length on a disc storage medium, data to be saved are stored in a buffer of a main memory in addition to previously accumulated saved data, and a first data block A and a second data block C which is located apart from the first data block A at a distance of at least one block size, are updated alternately by moving all data, including the data to be saved and the previously accumulated saved data, stored in the buffer, to the data block. This method enables sequential records to be added and written while insuring the integrity of the data without lowering the data transfer efficiency.

12 Claims, 5 Drawing Sheets

WRITE DATA IN TWO BLOCKS
BY ONE ACCESS IN THE 5TH STEP

WRITE DATA IN TWO BLOCKS BY ONE ACCESS IN THE 5TH STEP

METHOD OF WRITING SEQUENTIAL DATA TO A DISC MEMORY SYSTEM HAVING A FIXED BLOCK ARCHITECTURE

BACKGROUND OF THE INVENTION

1. Field of the Invention

The present invention relates to a method of writing a sequential record, and more particularly to a method of insuring the integrity of data that has been written to a disc medium adopting a fixed-length data recording system.

2. Description of the Related Art

As a method of securely writing data consisting of sequential records to a disc medium, a magnetic disc apparatus employing a variable-length data recording system (referred to as a CKD (Count Key Data) system hereinbelow as an example) has conventionally adopted a method by which data stored in a main memory are divided into blocks in two contiguous data storage areas and the obtained data, having a fixed length and the same content, are written to the above two contiguous data storage area.

FIG. 5 of the accompanying drawings is used for explaining a method of storing data having a variable-length sequential record in a prior art disc medium employing the CKD system. The detail of this method is as follows. For example, as shown in FIG. 5, when updating data 1, data 2, data 3 and data 4 stored in the main memory 31 of the host computer that are sequentially written to the disc medium, which has a data management area 21, data storage areas 22, 23 and 24, and gaps (areas on which no data are recorded) 25, the following steps are performed:

(1) In the first step, a write command is issued twice, and the data 1 are written to two consecutive disc blocks, i.e., the first data storage area 22 and the second data storage area 23;

(2) In the second step, both the data 1 and the data 2 are written in the same manner as in the first step;

(3) In the third step, the data 1, the data 2 and the data 3 are written in the same manner; and (4) if the data cannot be written in one data area in the fourth step, the area is shifted to the following second data storage area 23 and the following third data storage area 24 and the writing operation is repeated as in the first step.

When a magnetic disc apparatus adopting the CKD system is used, the gap 25 whose length is required for command processing (processing time) exists between the respective data storage areas, and a so-called rotational loss is not hence generated due to the latency of the disc medium, thereby enabling the writing operation.

To guarantee the integrity of the written data, when a failure has occurred during the operation for writing data to, for example, the first data storage area 22, the previously-written data remain in the second data storage area 23; when a failure occurs during the operation for writing information in the second data storage area 23, the previously-written data remain in the first data storage area 22. That is, the integrity of writing operation is guaranteed because data obtained immediately before occurrence of a failure remain on the disc medium.

However, when implementing the method adopted in the conventional CKD system for the magnetic disc apparatus employing the fixed-length data recording system (which will be referred to as an FBA (Fixed Block Architecture) system hereinbelow), for example, when the write command is successively issued twice as described above, since there is no gap whose length is required for command processing (processing time) and the data storage areas are continuously provided on the disc medium, the second write command can be issued only after the recording head has already passed the storage areas in the magnetic disc apparatus of the FBA system. In order to insure that the writing operation is free of any failure during the writing operation, the disc medium must be rotated one more time, and this rotational loss disadvantageously lowers the data transfer efficiency.

SUMMARY OF THE INVENTION

It is, therefore, an object of the present invention to provide a method of insuring the integrity of the operation for writing a sequential record by which data can be preserved, even if a failure has occurred during the writing operation when saving an undated data record on a disc storage medium adopting the FBA system.

To this end, the present invention provides a method of writing a sequential record on a disc type storage medium by which the sequential record is written to data blocks formatted by a fixed-length data recording system, comprising the steps of: storing a data to be saved, adding to previously accumulated data to be saved, in data storage means in a main memory of a host computer connected to a disc type storage using said disc type storage medium; and alternately updating one of a first and a second data storage areas comprising the data blocks, the second data storage area being located apart from the first data storage area at a distance of at least one block size. All data, including the data to be saved and the accumulated previous data to be saved, stored in the data storage means are written into the first and second data storage areas. The data to be saved is written to first data storage area first.

Further, when the second data storage area is full, the method according to the present invention further comprises the steps of: continuously updating two contiguous data storage areas including the first data storage and other first data storage area; and thereafter replacing the first and second data storage area with the other first data storage area and other second data storage area, respectively, comprising the data block. The other second data storage area is discontiguous with the other first data storage area.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENT

The present invention will now be described with reference to the accompanying drawings.

Figure 6:
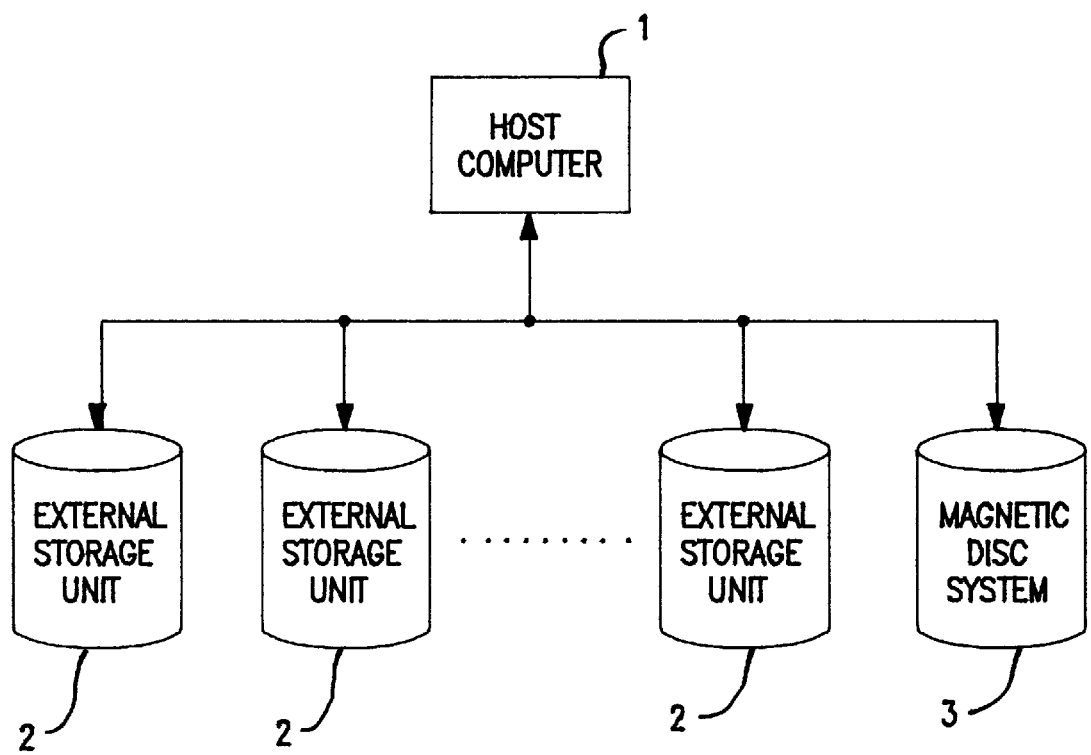
FIG. 6 is a block diagram showing an example of a computer system able to carry out the present invention.

The computer system shown in FIG. 6 is constituted by, for example, a host computer 1, a plurality of external storage units 2 and at least one magnetic disc system 3. It is assumed that the present invention saves (writes) undated data records to a disk storage medium of the magnetic disc system 3 used for a database or the like.

Here, as to the saved data, data in the database are restored by recovering data stored on the disc medium on which data updating records are saved when any failure has occurred in the computer system. The undated data records are sequentially written using two data storage areas (data blocks) which are not contiguous, for failure recovery purposes, in a computer system using an. FBA type magnetic disc system as a magnetic disc system for saving the updated records.

The detailed description will now be given as to a method of writing the saved data.

Figure 1A:
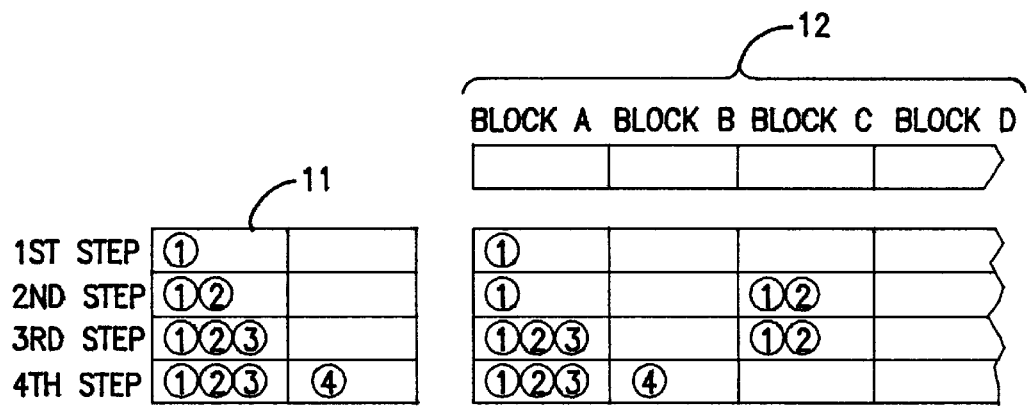
FIGS. 1a and 1b illustrates methods of storing data having a variable-length sequential record in a disc medium adopting the FBA system according to the present invention.

Referring to FIG. 1(a), in this embodiment, it is assumed that numbered data are stored in the main memory 11 of the host computer 1 and these data are added (updated) on the disc storage medium in the FBA type magnetic disc system 3 in numerical order. In addition, the disc storage medium is configured by blocks A, B, C, D, . . . (12).

(1) In a first step, data 1 are stored in the block A, which is defined as the base block.

(2) In a second step, the data 1 and data 2 are stored in, for example, a block C which does not follow the block A and is defined as the mate block. At this stage, since the data 1 still remain in the block A, the data exist which have been written before the failure even if the failure was generated during the second writing operation.

(3) In the third step, the data 1, the data 2, and the data 3 are then stored in the block A to repeat the update process.

(4) If the block A is filled during the third writing operation, the base block is changed to the block B and data 4 to be subsequently added are written in the block B, and the above-mentioned processes are thereafter repeated from the first step using the block B and, for example, a block D which does not follow the block B.

Figure 1B:
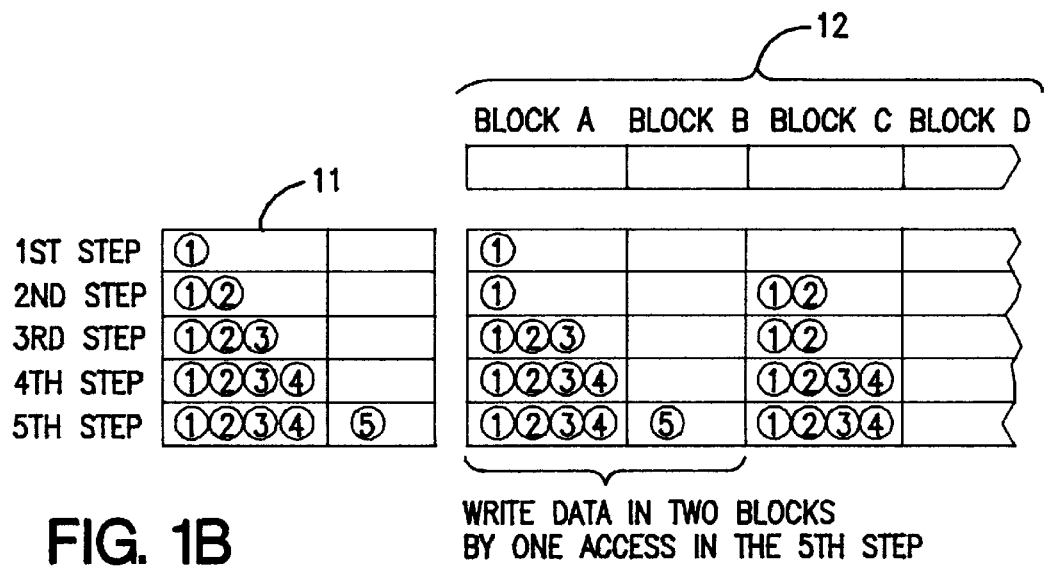

When the writing operation is shifted from the block A to the block B, the data 4 may be stored in the block C by, e.g., the fourth writing operation depending on a pattern of the length of data to be written (the data 1, the data 2, . . . ) as shown in FIG. 1 (b), and the data 4 are yet to be stored in the block A although the data 5 must be written in the block B by the fifth writing operation. Even though the data 4 is stored in the block C, the data 4 will be erased when the block C becomes the base block later on. Therefore, the data 4 must be written on block A which is the base block. In such a case, the following processes are carried out:

(5) In the fifth step, the data from 1 to 5 are written in the two contiguous blocks A and B by one access, and the above-mentioned processing is thereafter repeated from the first step using the block B and, e.g., the block D which does not follow the block B. After that the above-mentioned processing is thereafter repeated from the first step using the block C and, e.g., the block E which does not follow the block C. This enables the data to be sequentially added and written in the blocks A, B, C, D, E, F . . .

Figure 2:
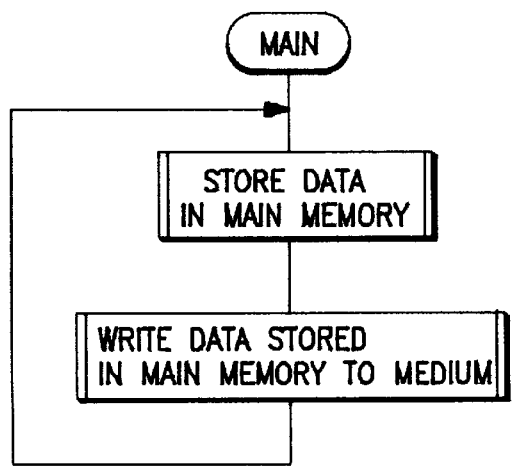
FIG. 2 is a flow chart showing a method of storing data having a variable-length sequential record in a disc medium adopting the FBA system.

FIG. 2 is a main flow chart showing the method of storing data according to the present invention. The main flow chart is constituted of two parts, i.e., store data to be saved in the main memory and write the data stored in the main memory to the disc medium.

Figure 3:
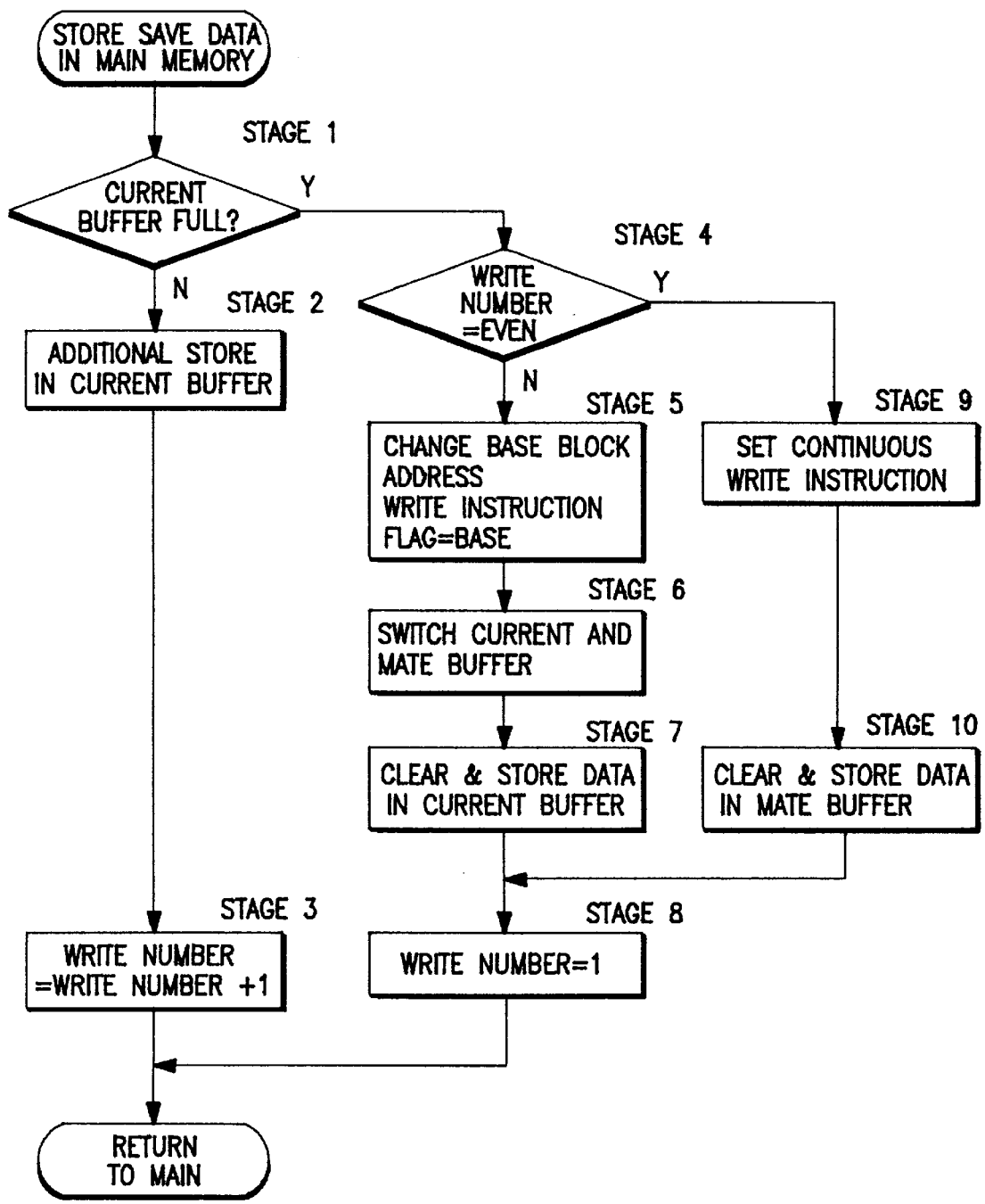
FIG. 3 is a flow chart showing a process of storing data to be saved in the main memory referred to in FIG. 2.

FIG. 3 is a flow chart showing a process of storing data in the above-mentioned main memory. Two buffer areas in the main memory are defined as the current buffer, which is the currently-used buffer and the mate buffer, which is used for continuous write operations. In FIG. 3, it is determined in STAGE 1 whether the current buffer is full. If the current buffer is not full, another data is additionally stored in the current buffer (STAGE 2) and +1 is added to the write number (STAGE 3).

If current buffer is full, it is determined whether the write number is even (STAGE 4). If the write number is an odd number, the base block address is changed, and a write instruction flag is set to base (STAGE 5). Then, the mate and current buffers are switched (STAGE 6). Thereafter, the current buffer is cleared and data is stored therein (STAGE 7), and the write number is set to 1 (STAGE 8).

If the write number is an even number, a continuous write instruction is set in order that data stored in the current buffer and the mate buffer are written continuously onto two contiguous block on the recording medium (STAGE 9). Thereafter, the mate buffer is cleared and data are stored therein (STAGE 10), and the write number is set to 1 (STAGE 8).

Figure 4:
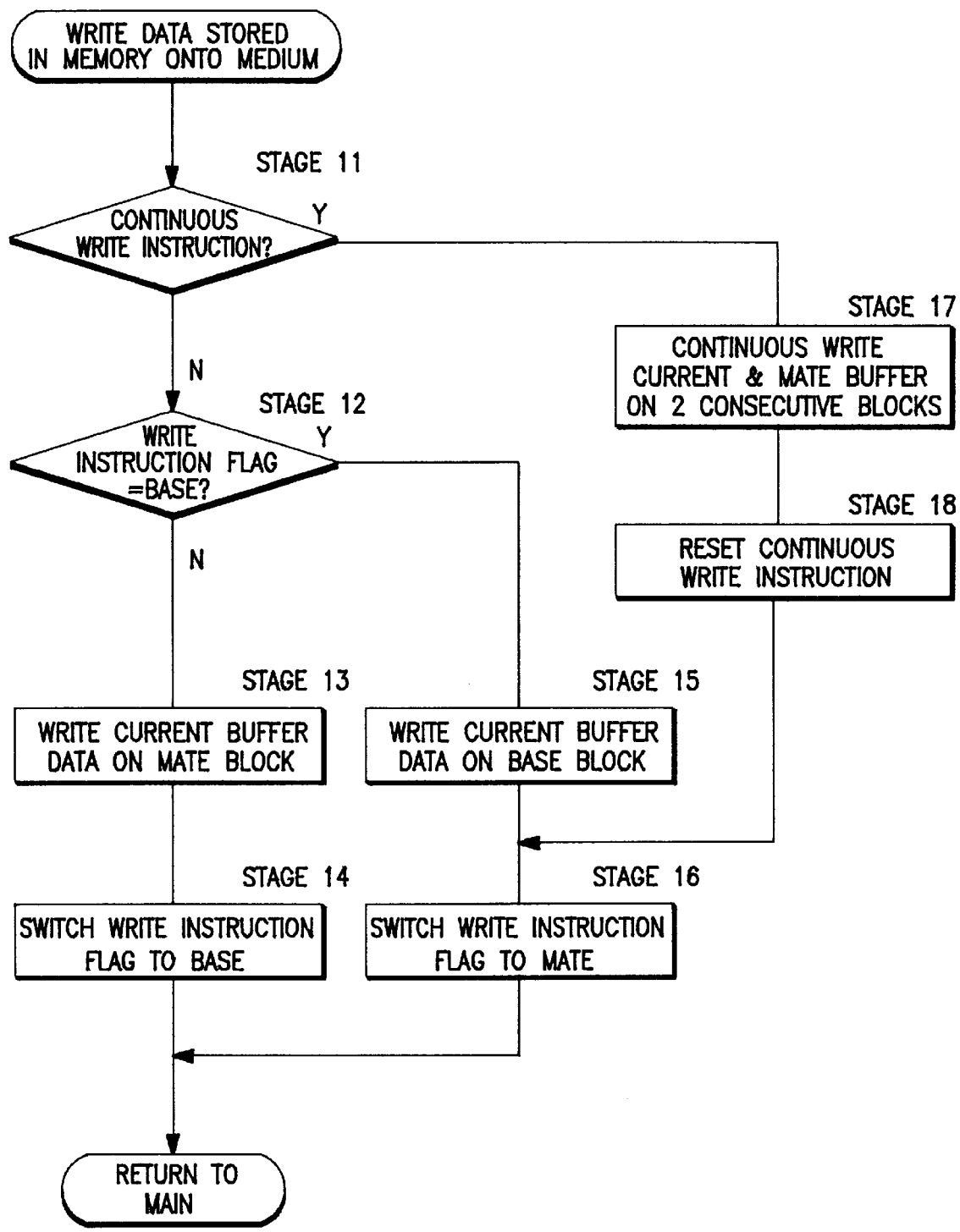
FIG. 4 is a flow chart showing a process of writing data stored in the memory onto a disc medium referred to in FIG. 2.
Figure 5:
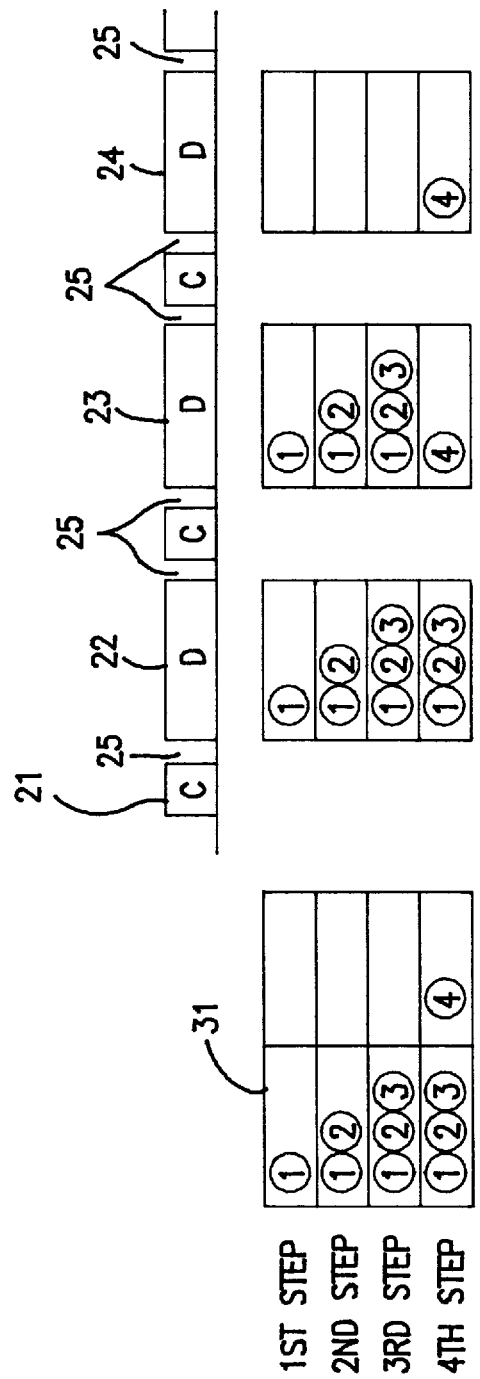
FIG. 5 illustrates a conventional method of storing data having variable-length sequential records in a disc medium adopting the CKD system.

FIG. 4 is a flow chart showing a process of writing data stored in the main memory to the recording medium. If a continuous write instruction is not carried out (STAGE 11), it is determined whether the continuous write instruction flag is set to base (STAGE 12). The write instruction flag shows onto which block, the base block or the mate block, the data are to be written next time. If the write instruction flag is not set to base, the current buffer data are written to the mate block of the medium (STAGE 13). Then the write instruction flag is switched to base (STAGE 14).

If the write instruction flag is set to base (STAGE 12), the current buffer data are written to the base block of the medium (STAGE 15). Then write instruction flag is switched to mate (STAGE 16). If a continuous write instruction is made (STAGE 11), the data stored in the current buffer and the mate buffer are written continuously to two consecutive block (block A and block B) on the recording medium (STAGE 17). Thereafter, the continuous write instruction is reset (STAGE 18) and the write instruction flag is set to mate (STAGE 16).

As described above, the present invention advantageously enables sequential records to be added and written by alternately updating two discontiguous data storage areas on the disc medium, without lowering the data transfer efficiency due to the rotational loss of the disc storage medium.

While this invention has been described with reference to an illustrative embodiment, this description is not intended to be construed in a limiting sense. Various other embodiments of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A method of writing sequential records on a disc type storage medium by which said sequential records are written to data blocks formatted by a fixed-length data recording system on said disc type storage medium, comprising the steps of:

storing data to be saved, said data to be saved adding to previously accumulated saved data, in data storing means in a main memory of a host system connected to a disc type storage having said disc type storage medium; and alternately updating one of a first and a second data storage areas comprising said data block, said second data storage area being located apart from said first data storage area at a distance of at least one block size, all data, including said data to be saved and said previously accumulated saved data, stored in said data storing means being written to said first and second data storage areas, wherein said data to be saved is written to said first data storage area first.

2. A method of writing a sequential record as defined as claim 1, wherein said data storing means is a buffer.

3. A method of writing sequential records as defined as claim 1, further comprising the steps of:

only when said first data storage area is full, replacing said first and second data storage area with other first and second data storage areas, respectively, comprising said data block, said other second data storage area being located apart from said other first data storage area.

4. A method of writing sequential records on a disc type storage medium by which said sequential records are written to data blocks formatted by a fixed-length data recording system on said disc type storage medium, comprising the steps of:

storing data to be saved, said data to be saved adding to previously accumulated saved data, in data storing means in a main memory of a host system connected to a disc type storage having said disc type storage medium; and alternately updating one of a first and a second data storage areas comprising said data block, said second data storage area being located apart from said first data storage area at a distance of at least one block size, all data, including said data to be saved and said previously accumulated saved data, stored in said data storing means being written to said first and second data storage areas, wherein said data to be saved is written to said first data storage area first, and when said second data storage area is full, continuously updating two contiguous data storage areas including said first data storage area and another data storage area; and thereafter replacing said first and second data storage areas with said another data storage area and yet a further data storage area, respectively, comprising said data block, said further data storage area being spaced apart from said another data storage area.

5. A method of writing sequential records as defined as claim 2, wherein said step of storing said data to be saved comprises the steps of:

determining whether a current buffer disposed in said buffer is full, and additionally storing a next data to be saved in said current buffer and adding to a write number if said current buffer is not full;

determining whether said write number is even, and clearing and storing data in a mate buffer disposed in said buffer, if said write number is even;

thereafter setting said write number to +1;

changing an address of said base block where said data to be saved is stored and setting a write instruction flag to base, if said write number is odd;

thereafter changing said mate buffer to said current buffer and changing said current buffer to said mate buffer;

thereafter clearing and storing data in said current buffer and setting said write number to 1.

6. A method of writing a sequential records as defined as claim 5, further comprising the step of:

setting a continuous write instruction if said write number is even so that two contiguous data storage areas can be updated consecutively.

7. A method of writing sequential records as defined as claim 6, wherein said step of alternately updating one of said first and second data storage areas comprises the steps of:

determining whether said continuous write instruction is set and determining whether said write instruction flag is set to base if said continuous write instruction is not set;

writing data stored in said current buffer to said second data storage area and setting said write instruction flag to base if said write instruction flag is not base;

writing data stored in said current buffer to said first data storage area and setting said write instruction flag to mate if said write instruction flag is base;

consecutively writing data stored in said current buffer and said mate buffer to two contiguous data storage areas including said first data storage area and other first data storage area if said continuous write instruction is set;

resetting said continuous write instruction; and thereafter setting said write instruction flag to mate.

8. A method of writing sequential data to data blocks of fixed block length on a disc using a fixed block architecture system, the sequential data being retrieved sequentially from a memory of a host computer, the method comprising the steps of:

writing a first segment of the sequential data to a first one of the data blocks on the disc;

writing the first segment and a second segment of the sequential data to a second one of the data blocks on the disc that is spaced from the first data block by a distance that is at least the fixed block length; and thereafter, sequentially appending further segments to the first and second segments and writing the respective sequentially grouped segments alternately to the first and second data blocks on the disc as each segment is appended, thereby overwriting the sequential grouped segments previously written to the first and second data blocks.

9. The method of claim 8, wherein the sequential data to be written is all data in a buffer for the memory of the host computer.

10. The method of claim 8, wherein when a size of the sequentially grouped segments to be written to the first data block is greater than a size of the first data block, further comprising the steps of writing a next segment of the sequential data to a third one of the data blocks on the disc that is spaced from the first data block, and thereafter sequentially appending further segments to the next segment and writing the respective sequentially grouped segments alternately to the third data block and to a fourth data block on the disc as each segment is appended, the fourth data block being spaced from the third data block by a distance that is at least the fixed block length.

11. The method of claim 8, wherein when a size of the sequentially grouped segments to be written to the second data block is greater than a size of the second data block, further comprising the step of writing the sequentially grouped segments continuously to two contiguous data blocks on the disc, one of the two contiguous data blocks being the first data block.

12. The method of claim 11, further comprising the steps of writing a next segment of the sequential data to a third one of the data blocks on the disc that is spaced from the first data block, and thereafter sequentially appending further segments to the next segment and writing the respective sequentially grouped segments alternately to the third data block and to a fourth data block on the disc as each segment is appended, the fourth data block being spaced from the third data block by a distance that is at least the fixed block length.

* * * * *